United States Patent [19]

Lasher

[11] 3,714,090

[45] Jan. 30, 1973

[54] HIGH TEMPERATURE POLYESTER COATING COMPOSITION

[75] Inventor: Edward A. Lasher, Beverly Hills, Calif.

[73] Assignee: Whittaker Corporation, Los Angeles, Calif.

[22] Filed: March 22, 1971

[21] Appl. No.: 126,975

[52] U.S. Cl. ............ 260/21, 117/132 B, 117/161 K, 117/161 LN, 260/22 R, 260/22 M, 260/22 CQ, 260/33.4 R, 260/33.6 R
[51] Int. Cl. ............................ C09d 3/52, C09d 3/66
[58] Field of Search ............... 260/21, 22 R, 22 CQ

[56] References Cited

UNITED STATES PATENTS

| | | | |
|---|---|---|---|
| 3,325,428 | 6/1967 | Graver et al. | 260/22 |
| 3,557,691 | 1/1971 | Bayer | 101/129 |
| 3,575,901 | 4/1971 | Ashjian | 260/22 |
| 3,223,658 | 12/1965 | Kraft et al. | 260/22 |
| 2,609,348 | 9/1952 | Dupuis et al. | 260/22 |
| 3,467,610 | 9/1969 | Fiarman et al. | 260/22 |

Primary Examiner—Donald E. Czaja
Assistant Examiner—Ronald W. Griffin
Attorney—Donald E. Nist and Jay H. Quartz

[57] ABSTRACT

A polyester coating composition is produced by heating a reaction mixture comprising (a) 17—24 percent by weight of a fatty acid, (b) 30—42 percent of a polyol moiety consisting of 45—70 percent of a triol with the remainder being diol, and (c) 40—56 percent of a polycarboxylic acid moiety consisting of 83—93 percent of an aromatic polycarboxylic acid with the remainder being an aliphatic polycarboxylic acid, to a temperature, generally between 400° and 480°F, and for a time sufficient to esterify the reactants. Preferably, this coating composition is reacted with an aminoplast resin to cause cross-linking to produce a hard, flexible paint which is capable of withstanding high temperatures without noticeable discoloration and which is particularly useful for coil coating.

9 Claims, No Drawings

HIGH TEMPERATURE POLYESTER COATING COMPOSITION

BACKGROUND OF THE INVENTION

This invention relates to polyester resins and to paints made therefrom.

The coating or painting of metal containers may be performed before or after the metal is formed into the containers. Preferably, the metal is coated prior to being formed into containers to take advantage of the lower costs associated with the continuous coating of coils (metal sheet in roll form). However, coil coating requires the use of paints which are hard enough to resist abuse associated with metal container manufacture including the weight of the coil pressing on its inner layers and yet flexible enough to withstand the container-forming steps without cracking or chipping.

At present, a number of different types of compositions are available. However, each has several disadvantages and, thus, none of these compositions presently satisfies the aforementioned coating properties requirements. For example, both oil-free and dimer acid modified polyester coating compositions are available but their use is generally resisted by major coil coaters because coatings produced from these polyesters have a significant tendency to show flow patterns, crater defects and minute wrinkles. These film defects result from the high sensitivity of these polyesters to even small changes in coil coating line conditions. This sensitivity, in turn, results from the need to use strong solvents or solvent systems with these polyesters. In addition to the increased expense associated with the use of strong solvents, use of the latter is characterized by a significant reduction in the range of operating conditions within which satisfactory coating can be obtained.

As used herein, the terms "strong" and "weak" solvents are used to designate hydrocarbon solvents having kauributanol values (KB values) of 90 and higher, and less than 90 and above about 70, respectively.

Coil coaters have generally turned to alkyd-amino and acrylic-amino coating compositions because of the aforementioned disadvantages of the presently available oil-free and dimer acid modified coating compositions. However, these compositions are not completely satisfactory because they do not exhibit the requisite combination of hardness and flexibility.

Regardless of whether containers are coated prior to or after being formed, they are all subjected to heating operations intended to cure the various coatings applied to the container metal. For example, heating steps are employed to cure the base coats, to dry inks applied to the latter for labeling, to cure the inner liner, and to cure abrasion-resistant top coats where the latter are employed. During these heating steps, the containers or the coils may be subjected to temperatures in excess of 445°F for as long as twenty minutes particularly if large containers, e.g., drums, are involved. During these steps, presently employed coating compositions tend to discolor. This condition often cannot be tolerated, particularly if white paints are involved. If steps are taken to avoid the higher temperatures, the paint cure may not be satisfactory or the cure time may be too long. Additionally, even when "safe" temperatures are employed, inadvertent increases in temperature may occur with attendant discoloration.

SUMMARY OF THE INVENTION

The method of this invention produces a polyester coating composition which is a multi-purpose composition which is particularly useful in coil-coating operations, but which may also be advantageously used for coating formed containers and other metal products. This method comprises heating a reaction mixture comprising (a) a fatty acid, (b) a polyol moiety consisting of both a triol and a diol, and (c) a polycarboxylic acid moiety consisting of both an aliphatic and an aromatic polycarboxylic acid to a temperature and for a time sufficient to esterify the reactants. The reactants are employed in the following amounts: fatty acid — about 17 percent to about 24 percent; polyol — about 30 percent to about 42 percent with the triol comprising about 45 percent to about 70 percent of the polyol moiety; and polycarboxylic acid — about 40 percent to about 56 percent with the aromatic polycarboxylic acid constituting about 83 percent to about 93 percent of the polycarboxylic moiety. The reaction mixture is generally heated to a temperature between about 400°F and about 480°F.

While the coating so formed may be used as-is for the aforementioned purposes, it is preferable to cross-link this coating by reacting it with an aminoplast resin, e.g., about 8—20 percent.

The coatings of this invention, and particularly those coatings produced by cross-linking with an aminoplast resin, yield a film, when cured, that has excellent mar resistance and hardness with good flexibility. Additionally, the cured coatings are substantially free from staining by such materials as mustard, ballpoint pen ink, road tar oil, tobacco tars, tincture of iodine, and lipstick.

Furthermore, the polyester resins of this invention, prior to curing, are easy to handle and can be readily applied to substrates. These polyester resins, prior to curing, are readily soluble in solvents having KB values as low as 70—75. For this reason, these resins can be readily applied to a suitable substrate, even though line conditions may change, without producing the film defects which result from use of strong solvents with prior art polyesters when the same changes in line conditions occur.

In addition to exhibiting the foregoing advantages, the herein-described paints can withstand temperatures up to about 500°F for 3 minutes and about 450°F for 20 minutes without noticeably discoloring. Therefore, advantage can be taken of higher cure temperatures to produce well-cured paints in a relatively short time. The chance of discoloration from inadvertent increases in temperature are also substantially eliminated. This means that less skilled personnel can be employed.

DESCRIPTION OF THE PREFERRED EMBODIMENT

As used herein and in the claims, all percentages, unless otherwise indicated, are percentages by weight of the relevant reaction mixture (excluding solvents).

In general, a reaction mixture is made up to include (a) a fatty acid, (b) a polyol moiety including both a triol and a diol, and (c) a polycarboxylic acid moiety including both an aromatic and an aliphatic polycarboxylic acid. These reactants are preferably dissolved in a suitable solvent and then the resulting reaction mixture is heated to a temperature sufficient to esterify the reactants (a), (b), and (c). The resulting coating composition is preferably cross-linked using an aminoplast resin to produce a paint.

The fatty acids employed herein are aliphatic carboxylic acids and include both saturated (including hydrogenated) and unsaturated monobasic carboxylic acids having from 10 to 26 carbon atoms. The use of carboxylic acids having less than 10 carbon atoms produces solubility problems. These acids may be naturally occurring or synthetic. Saturated fatty acids are preferred because of their resistance to discoloration when the coatings are "overbaked." As the degree of unsaturation increases, the tendency of the coatings to discolor due to overbaking increases considerably. The most commonly employed fatty acids are palmitic, oleic and stearic because of their relatively low cost and availability. Other useful fatty acids having from 10—26 carbon atoms are listed in Fieser and Fieser, Organic Chemistry, pp. 400, 401, 3rd ed. (1956). The fatty acids may be employed individually or as fatty acid mixtures.

The fatty acid reactant is employed in an amount between about 17 percent and about 24 percent. Below about 17 percent, stronger solvents (having KB values greater than 90) are required and flow of the uncured coatings and paints onto substrates is noticeably less even. Above about 24 percent, the cured coatings and paints are too soft. Although additional aminoplast resin could be employed in the paint formulations to improve paint hardness, this could be accomplished only at the expense of a substantial decrease in flexibility.

The polycarboxylic acid constituent employed herein is a mixture of one or more aromatic polycarboxylic acids with one or more aliphatic polycarboxylic acids. As used herein, the term "polycarboxylic acid" refers to the acids themselves as well as to the corresponding anhydrides of such acids. The aromatic polycarboxylic acids include: orthophthalic acid, isophthalic acid, terephthalic acid, tetrahydrophthalic acid, hexahydrophthalic acid and endomethylene tetrahydrophthalic acid, naphthalene dicarboxylic acids such as 1,4-, 1,8-, and 2,3-naphthalene dicarboxylic acids. Halogenated derivatives of the aforementioned polycarboxylic acids and anhydrides may also be employed herein. The latter derivatives include, for example, tetrachlorophthalic acid and tetrabromophthalic acid.

The aliphatic polycarboxylic acids employed herein have from three to 18 carbons and include: malonic acid, succinic acid, glutaric acid, adipic acid, suberic acid, azelaic acid, trimethyl adipic acid, sebacic acid and dodecenyl succinic acid. Adipic acid is presently preferred because of its low cost, availability and the excellent result obtained from its use.

The concentration of the polycarboxylic acid component in the reaction mixture varies between about 40 percent and about 56 percent. Below about 40 percent, both the hardness and chemical resistance of the cured polyester resins are substantially reduced. Above about 56 percent, there is a significant loss in flexibility. That is, embrittlement occurs with the result that cracking of the coatings occurs when the underlying substrate is bent.

The concentration of the aromatic polycarboxylic acid moiety in the polycarboxylic acid mixture varies between about 83 percent and about 93 percent with the remainder of the polycarboxylic acid component being the aliphatic moiety. Below about 83 percent by weight of aromatic polycarboxylic acid, hardness is lost whereas, above about 93 percent, flexibility is lost.

The polyol derivative of this invention comprises the combination of one or more triols with one or more diols. Triols which may be used include the following: glycerine, trimethylol ethane, trimethylol propane, trimethylol butane, hexanetriol, and pentanetriol. Useful diols include the following: ethylene glycol, 1,2-and 1,3-propylene glycol, 1,3-and 1,4-butylene glycol, 1,5-pentane diol, 1,6-hexanediol, cyclohexane dimethanol, 2-ethyl, 2-methyl,1,3-propane diol, neopentyl glycol, diethylene glycol, and dipropylene glycol.

The amount of polyol employed is primarily dependent upon the amount of carboxylic acid in the reaction mixture. An amount of polyol is used which is sufficient to substantially completely esterify the carboxylic acid. If substantial amounts of carboxylic acid remain unreacted (with respect to the polyol), the improved hardness and flexure properties characterizing the cured resins of this invention will not be obtained. Therefore, at least a stoichiometric amount of polyol is employed. Preferably, about 20–24 percent excess polyol is employed. The use of higher amounts of polyol results in cured resins having relatively poorer exposure properties. In view of the foregoing, the amount of polyol varies between about 30 percent and about 42 percent.

The triol fraction of the polyol component varies between about 45 percent and about 70 percent of the weight of the polyol derivative with the remainder being diol. Below about 45 percent of triol in the polyol derivative, the cured polyester resin is characterized by being softer and having poorer chemical (stain) resistance. Above about 70 percent of triol, embrittlement occurs and the resin viscosity increases to the extent that gellation occurs before the esterification end point is reached.

The solvents employed during the course of reaction may include, for example, xylene, toluene, benzene and cyclohexanone. The solvents employed to thin the resulting reaction product may include, for example, any of the foregoing solvents as well as Amsco solvent D-65 with a boiling range of 158° to 185°C and kauributanol value of 72, Amsco solvent F with a boiling range of 183° to 206°C and a kauri-butanol value of 74, Amsco solvent G with a boiling range of 184° to 209°C and kauri-butanol value of 90, Amsco solvent HC with a boiling range of 241° to 275°C and a kauri-butanol value of 98.

The method employed to produce the heredescribed polyester resin coatings is a one-step or batch process in which amounts, within the aforedescribed ranges, of the fatty acid, polyol moiety and polycarboxylic acid moiety are preferably dissolved in a suitable solvent. This reaction mixture is then heated to a temperature sufficient to cause esterification of the reactants. Esterification could be obtained at, for example, 300°F in a high vacuum. However, an inordinately long time (greater than 24 hrs.) would be required to complete the reaction. Therefore, it is preferable to raise the reactants to a temperature between about 400°F and about 480°F although 14—20 hr. may still be required at temperatures at the lower end of this temperature range. Above about 480°F, discoloration may result. Most preferably, the reactants are heated to a temperature between about 440°F and about 465°F. Within this range, the reaction time varies between about 6—7 hr. and discoloration does not occur. To avoid oxidation of one or more of the reactants or products at these elevated temperatures, the reaction is carried out in an atmosphere inert to the reactants and products. For example, inert gases such as nitrogen or carbon dioxide may be bubbled through the reaction mixture. The latter is preferably agitated, e.g., by stirring, to produce a substantially homogeneous result.

In general, the reaction will be substantially complete if the Gardner-Holdt viscosity of this solution is at least J viscosity (50 percent solution in xylene) and, preferably, between L and M (although higher viscosities are attainable and permissible) with an acid number preferably below 10. The resulting reaction mixture may then be thinned to a desired solids content with any appropriate solvent.

The polyester resin coatings made in this way may be used as-is or, preferably, modified by cross-linking using an aminoplast resin. The aminoplast resins include, for example, butylated urea-formaldehyde resins, butylated melamine-formaldehyde resins, hexamethoxymethylmelamine or mixtures of various hydroxymethyl-melamine-methyl ethers such as the pentamethyoxymethylmelamine and the tetramethoxymethyl melamines. The hydroxymethylmelamine and hydroxymethyl ureas may also be etherified with alcohols other than methyl or butyl such as ethyl, propyl, isobutyl and isopropyl. Preferably, hexamethoxymethylmelamine alone or in combination with butylated melamine resin is employed. The amount of aminoplast resin employed with the polyester resin is less than about 20 percent of the weight of total resin solids in the mixture. Above about 20 percent, the cured resin is too brittle. The aforementioned preferred aminoplast resin is preferably used in the range of 8 to 14 percent of total resin solids whereas butylated melamine, which has a higher ether linkage content is preferably used in amounts near the 20 percent limit.

Various constituents, for example, coloring agents and fillers may be included in the paint formulations as is well known in the art.

This invention will now be further described by the following Examples. In each of these Examples, the term "parts" is parts by weight.

EXAMPLE 1

A. Formulation of polyester resins according to this invention.

A series (A-L) of polyester resins of the herein-described invention were made up as follows. The reactants shown in Table 1 were charged to a reaction vessel appropriately fitted with stirrer, heater and temperature indicator. In some cases, a solvent was also added to the reaction mixture as shown in Table 1. Additionally, glycerine (2 percent) ) was included in formulation K. A stream of carbon dioxide gas was bubbled through the reaction mixture. Heating of the reaction vessel was then started and, from time to time, Amsco B solvent was added in amounts sufficient to control the refluxing conditions. The temperature of the mixture was slowly raised to about 465°—470°F over a period of 5—7 hr. This temperature was held (2—3 hr.) until a 50 percent solution of the reaction solids in xylene had a Gardner-Holdt viscosity of at least L. The heat was then shut off and the mixture was allowed to cool.

The cooled reaction mass was thinned to 60 percent solids by addition of a solvent mixture comprising 87.5 percent (by volume) Amsco G, 2.5 percent Amsco B and 10 percent n-butanol. The acid number on the solids and the viscosity of this 60 percent solids solution are given in Table 1.

B. Formulation of white paints, which are particularly useful for can coating, from the resins of A.

White paints were formulated from the resins of part A as follows. In each case, 8.40 parts (by weight) of one of the polyester resins, thinned to 60 percent solids as described, were combined with 33.6 parts of Dupont R-966 titanium dioxide and 11.1 parts of Amsco G solvent in a ball mill and milled until a particle size of 7H was obtained. To the resulting mixture, there was added with stirring, 28.2 parts of the same polyester resin, 10.0 parts of Resimene 875 (50 percent butylated melamine) and a solvent mixture comprising 4.49 parts of 2-ethyl hexanol, 3.37 parts of Amsco HC solvent and 0.84 parts of butanol.

The viscosities of these paint formulations were determined and were found to vary between 21 sec. and 23 sec. (No. 3 Zahn cup at 25°C). Each formulation was applied to bare aluminum panels and cured at 375°F for 1 min. to produce a dry film having a thickness of 0.15 mils. The flow of the uncured paints onto the aluminum was noted in each case and was found to be excellent. The pencil hardness of each film was found to be H— and the adhesion to bare aluminum was excellent. Ink adhesion over these white paints was also excellent. Each panel was given an overbake at 400°F for 4 min. The color and gloss of each panel was noted following the overbake. No change in either was observed. The hardness of the overbaked films was tested and was found to be the same as before overbaking except for an increase to H for the paints which included resins E-H and except for an increase to 2H for the paint which included resin I. The flexibility of these paints on a primed aluminum panel was sufficient to pass a 1T-180° flexibility test. C. Formulation of white paints which are particularly useful for coil coating.

White paints were formulated as described in part B of this Example using resins A-D and I-L except that the constituent concentrations were varied as follows. The first mixture contained 11.6 parts of the resin, 24.0 parts of titanium dioxide and 6.6 parts of Amsco G solvent. The second mixture in addition to containing the first mixture, included an additional 38.7 parts of the same resin, 6.8 parts of a 50 percent hexamethoxymethylmelamine solution, 1.5 parts of a 60 percent butylated melamine solution, 510 parts of Amsco solvent HC, 1.8 parts of a 13 percent wax solution, 4.0 parts of Amsco G solvent and 0.26 parts of 1010 catalyst (para-toluene sulphonic acid — 20 percent solution in isopropanol. The viscosity (NO. 3 Zahn cup at 25°C) of the resulting uncured paint formulations varied between 23 sec. and 24 sec.

These formulation were coated on primed aluminum panels and cured at 600°F for 1 min. Flow of the paints was excellent. The pencil hardness of the cured films was H except for the paint which included resin I. Its pencil hardness was 2H. These cured paints were not stained by a 2 percent iodine solution and were not attacked by MEK (1 minute double rub). Their flexibility was approximately the same as that of the paints of part B.

As will be understood from Example 1, the paint formulations can be tailored, within the concentration ranges set forth herein, to different applications requirements. However, it will be noted that both groups (can and coil) of paints exhibit both good flexibility and hardness. The primary difference is that the can coatings are better able to withstand higher temperatures without discoloration than are the coil coatings formulated in Example 1. The can coatings, of course, could be used for coil coating purposes since they otherwise exhibit substantially the same properties as the coil coatings. Such coatings are multi-purpose coatings.

vent consisted of 2.5 percent Amsco B, 77.5 percent Amsco G, and 20 percent n-butanol), are also shown in Table 2.

TABLE 2

| Component or Property | WEIGHT % | | | | | |
|---|---|---|---|---|---|---|
| | M | N | O | P | Q | R |
| Tallow fatty acid T-10 (65—70% stearic and 35—30% palmitic acids) | 21.5 | 19.4 | 18.5 | 18.6 | 18.2 | 19.1 |
| Trimethylol ethane | 23.4 | | | 23.2 | | |
| Trimethylol propane | | 19.0 | 25.4 | | 25.0 | 26.1 |
| Neopentyl glycol | 12.1 | 18.1 | | 11.7 | | |
| Dipropylene glycol | | | 14.4 | | | |
| 1,4-cyclohexane-dimethanol | | | | | 15.7 | |
| Diethylene glycol | | | | | | 11.7 |
| Phthalic anhydride | 38.8 | | 37.5 | 38.8 | 37.1 | 38.8 |
| Isophthalic acid - 95 | | 40.3 | | | | |
| Adipic acid | 4.3 | 3.1 | 4.2 | | 4.1 | 4.3 |
| Dodecenyl succinic anhydride | | | | 7.8 | | |
| Viscosity (50% in xylol) | L | O | U | L | L | L |
| Viscosity (60% solids) | $Z^1$ | $Z^2$ | $Z^2$ | $Z^1$ | $Z^1$ | $Z^1$ |
| Acid no. | 9.1 | 11.1 | 11.7 | 7.4 | 6.55 | 9.7 |

TABLE 1

| Component or property | Weight percent | | | | | | | | | | | |
|---|---|---|---|---|---|---|---|---|---|---|---|---|
| | A | B | C | D | E | F | G | H | I | J | K | L |
| Hyfac 421 (hydrogenated tallow fatty acid)[1] | 17.4 | | | | | | 19.1 | | | | 17.5 | 17.6 |
| Hyfac 422 (hydrogenated tallow fatty acid)[1] | | 19.1 | | | | | | | | | | |
| Acintol EPG (oleic acid from tall oil) | | | 19.0 | | | | | | | | | |
| Emersol 132 (stearic acid)[1] | | | | 19.0 | | | | | | | | |
| Tallow acid T-10F (65-70% stearic and 30-35% palmitic)[1] | | | | | 19.1 | | | | | | | |
| Emersol 153 (95% stearic and 5% palmitic acids) | | | | | | 19.1 | | | | | | |
| Emery stearic acid #150 (80% stearic and 20% palmitic) | | | | | | | | 19.0 | | | | |
| Pamolyn CL 300 (conjugated double bond fatty acids from tall oil) | | | | | | | | | 19.0 | | | |
| 610—Soya fatty acid | | | | | | | | | | 19.0 | | |
| Trimethylol propane | 26.3±0.2 | 26.3±0.2 | 26.3±0.2 | 26.3±0.2 | 26.3±0.2 | 26.3±0.2 | 26.3±0.2 | 26.3±0.2 | 26.3±0.2 | 26.3±0.2 | 26.3±0.2 | 23.7 |
| Neopentyl glycol | 11.9±0.3 | 11.9±0.3 | 11.9±0.3 | 11.9±0.3 | 11.9±0.3 | 11.9±0.3 | 11.9±0.3 | 11.9±0.3 | 11.9±0.3 | 11.9±0.3 | 11.9±0.3 | 11.9±0.3 |
| Phthalic anhydride | 39.6 | 38.7 | 38.7 | 38.7 | 38.7 | 38.7 | 38.7 | 38.7 | 38.7 | 38.7 | 39.7 | 40.1 |
| Adipic acid | 4.35±0.1 | 4.35±0.1 | 4.35±0.1 | 4.35±0.1 | 4.35±0.1 | 4.35±0.1 | 4.35±0.1 | 4.35±0.1 | 4.35±0.1 | 4.35±0.1 | 4.35±0.1 | 4.35±0.1 |
| Solvent (gm.): Lactol spirits | 20 | | | | 20 | 20 | 20 | 20 | 20 | | | |
| Methanol | | 38 | | | | | | | | | | |
| Acid number | 6.8 | 6.1 | 5.8 | 7.5 | 6.0 | 6.6 | 7.1 | 7.9 | 7.5 | 5.0 | 9.0 | 8.1 |
| Viscosity | $Z^4$ | $Z^4$ | $Z^4$ | $Z^4$ | $Z^4$ | $Z^4$ | $Z^4+$ | $Z^4$ | $Z^4$ | $Z^4$ | $Z^4+$ | $Z^4+$ |

[1] Also includes small amounts of myristic, pentadecanoic, margaric and oleic acids.

EXAMPLE 2

A number of polyester resins (M-R) were made up as described in Example 1 except that different constituents and amounts were sometimes used as shown in Table 2. The final properties of the resulting polyester resins, thinned to 60 percent solids in a solvent mixture comprising 2.5 percent Amsco B, 87.5 percent Amsco G and 10 percent n-butanol (except O for which the sol- From these polyester resins, paints which are particularly useful for coil coating were made up as described in Example 1 using the same components, except for the polyester resin, and the same concentrations.

The resulting white paints were coated on primed aluminum panels and cured at 600°F for 1 min. to give a film thickness of 0.75 mil. Physical and chemical tests were performed on the paints before and after cure.

The test results are summarized in Table 3.

TABLE 3

| TEST | Paint Corresponding to Resin | | | | |
|---|---|---|---|---|---|
| | M | N | O | P | Q | R |
| Viscosity (No. 3 Zahn at 25°C) | 22" | 24" | 35" | 24" | 23" | 23" |
| Pencil hardness | H+ | H+ | 2H– | 2H | 2H+ | 2H– |
| Flow | fair | exc. | fair | exc. | v. gd | fair |
| Gloss at 60° | | | 100+ | | | |
| Forming (1T–180°) | | | o.k. | | | |
| Chem. resistance | | | | | | |
| Iodine (2%) | | | no stain | | | |
| MEK (1 Min. rub) | | | no attack | | | |

Paints suitable for can coating were also made up from the polyester resins (M-R) as described in Example 1 including using the same constituents (except for the resin) and the same constituent concentrations. These white paints were coated on bar aluminum panels and cured at 375°F for 1 min. Thereafter, they were subjected to an overbake of 400°F for 4 min. Tests were conducted before coating, after curing and after overbaking. The test results are shown in Table 4.

TABLE 4

| Test | Paint Corresponding to Resin | | | | |
|---|---|---|---|---|---|
| | M | N | O | P | Q | R |
| Viscosity (No. 3 Zahn at 25°C) | 21" | 22" | 30" | 19" | 19" | 19" |
| Pencil hardness | H– | H– | H– | H | H | F+ |
| Flow | exc. | exc. | v. gd | exc. | exc. | exc. |
| Gloss at 60° | | | 100+ | | | |
| Adhesion over bare alum. | | | Exc. | | | |
| Ink adhesion over paint | | | Exc. | | | |
| Overbake Color & gloss stability | | | Exc. | | | |
| Pencil hardness | 2H– | 2H | 2H | 2H+ | 2H+ | 2H– |

I claim:

1. The polyester resin obtained by the esterification of:
   a. a fatty acid having from 10 to 26 carbon atoms in an amount by weight between about 17 percent and about 24 percent of the total weight of (a), (b) and (c);
   b. a polyol moiety in an amount by weight between about 30 percent and about 42 percent, said polyol moiety consisting of between about 45 percent and about 70 percent by weight of a triol with the remainder being diol; and
   c. a polycarboxylic acid moiety in an amount by weight between about 40 percent and about 56 percent, said polycarboxylic acid moiety consisting of between about 83 percent and about 93 percent by weight of an aromatic polycarboxylic acid with the remainder being an aliphatic polycarboxylic acid having from three to 18 carbon atoms.

2. The polyester resin of claim 1 which has a Gardner-Holdt viscosity of at least J at a 50 percent solids concentration in xylene and which has a solids acid number of less than about 10.

3. The polyester resin of claim 1 wherein said fatty acid is saturated.

4. The polyester resin of claim 3 wherein said triol is selected from the group consisting of glycerine, trimethylol ethane, trimethylol propane, trimethylol butane, hexanetriol and pentanetriol.

5. The polyester resin of claim 4 wherein said diol is selected from the group consisting of ethylene glycol, 1,2- and 1,3 propylene glycol, 1,3- and 1,4-butylene glycol, 1,5-pentane diol, 1,6- hexane diol, cyclohexane dimethanol, 2-ethyl, 2-methyl, 1,3- propane diol, neopentyl glycol, diethylene glycol and dipropylene glycol.

6. The polyester resin of claim 5 wherein said aromatic dicarboxylic acid is selected from the group consisting of orthophthalic acid, isophthalic acid, terephthalic acid, endomethylene tetrahydrophthalic acid, and 1,4—, 1,8—, and 2,3—naphthalene dicarboxylic acids or anhydrides thereof.

7. The polyester resin of claim 6 wherein said aliphatic dicarboxylic acid is selected from the group consisting of malonic acid, succinic acid, glutaric acid, adipic acid, suberic acid, azelaic acid, trimethyl adipic acid, sebacic acid and dodecenyl succinic acid or anhydrides thereof.

8. The high temperature-resisting coating composition obtained by the reaction of the polyester resin of claim 1 with an aminoplast resin in an amount less than about 20 percent by weight of the weight of said polyester and aminoplast resins.

9. A high temperature-resisting coating composition which is the reaction product of the polyester resin of claim 2 with an aminoplast resin in an amount less than about 20 percent by weight of the total weight of said polyester and aminoplast resins.

* * * * *